May 4, 1954 W. E. DAVIS Re. 23,821
VARIABLE OUTPUT REFRIGERATION SYSTEM
Original Filed Nov. 15, 1950
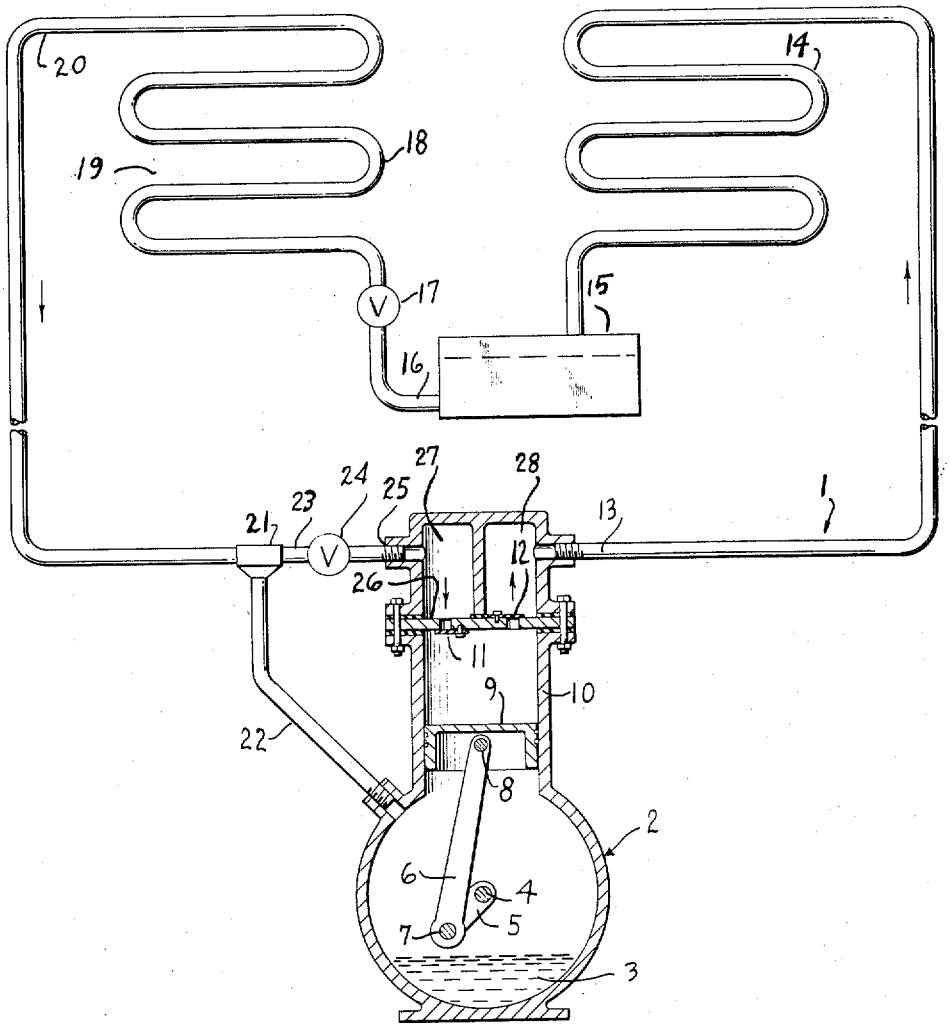
William E. Davis
INVENTOR.
BY Lester B. Clark
ATTORNEY Reissued May 4, 1954

Re. 23,821

UNITED STATES PATENT OFFICE 23,821

VARIABLE OUTPUT REFRIGERATION SYSTEM

William E. Davis, Houston, Tex.

Original No. 2,603,954, dated July 22, 1952, Serial No. 195,885, November 15, 1950. Application for reissue January 12, 1953, Serial No. 330,933

3 Claims. (Cl. 62—117.1)

Matter enclosed in heavy brackets [ ] appears in the original patent but forms no part of this reissue specification; matter printed in italics indicates the additions made by reissue.

This invention relates to control apparatus for compressors of the gaseous fluid type and more particularly to control apparatus for air conditioning and refrigerating systems of the compression type in which the system, including the compressor, uses a condensable gas which is kept confined in the system.

The general object of this invention is to provide a simple and improved apparatus wherein the input of mechanical energy to the compressor and the transfer of thermal energy of the system can be controlled without stopping the compressor or without varying the speed of the compressor.

It is an object of this invention to provide a system of controlling and limiting the amount of mechanical energy used to drive the compressor and the amount of thermal energy transferred by the system, even though the compressor may be driven by a source which necessitates its operation over a range of speeds such as when used in connection with air conditioning or refrigerating apparatus in automobiles, trucks, railway coaches, and the like, where the compressor is driven from the motor or the wheels of the vehicle.

It is another object of this invention to control input of mechanical energy and the transfer of thermal energy so that it will approach the required load conditions without stopping or varying the speed of the compressor.

Another object of this invention is to stop or limit the flow of gas through the valves of the compressor, without varying the speeds of the compressor, so that the amount of gas flowing through them will be reduced when the amount of refrigeration required is reduced, rather than increasing the amount of gas passing through the compressor as is done by the "by-pass" systems where the outlet of the compressor is led back into the inlet of the compressor raising the back pressure and increasing the total amount of gas passing through the compressor.

Another object of this invention is to limit the power input and output of the compressor so that it will not be loaded beyond its rated capacity even though it should be run at a speed which would normally cause it to overload and break down.

Another object of this invention is to keep the refrigeration system itself from becoming overloaded or freezing up even though the speed of the compressor should exceed its normal speed.

Another object of this invention is to provide a method of reducing the starting load on the compressor used in a refrigeration system of the closed compression type.

It is another object of this invention to provide an improved system of controlling the load of a compressor without causing excessive changes in pressure "in the low side" of the system as when the gas is "by-passed" from the high side to the low side.

It is also an object of this invention to provide an improved system for completely shutting off the refrigerating system where it is impractical to stop the compressor driving motor such as when large motors are used or when the motor is also used for other purposes.

Other and further objects are apparent when the specification is considered in connection with the drawings in which:

Figure 1, the single figure, partially in section, and partially diagrammatic, represents a typical compressor type refrigerating system employed in connection with this invention.

The refrigerating system 1 includes therewith a compressor 2 having an oil sump 3 to be hereinafter described in connection with specific features of this invention, a shaft 4 journalled in the compressor body, a crank arm 5 rigidly connected to the shaft 4, a piston rod 6 pivotally connected to the crank 5 at 7 and to the piston 9 at 8. The rotation of the shaft 4 causes the piston to reciprocate in the cylinder 10. On the downstroke of the piston the inlet valve 11 is opened so the fluid may enter the cylinder, and on the up-stroke of the piston 9 fluid is discharged upwardly through the outlet valve 12 to pass out into the discharge line 13.

The refrigerating system herein described operates conventionally by delivering the fluid in the form of a hot high pressure gas into the condenser coils 14 where the heat is removed therefrom with the result that the gas liquefies and is delivered, preferably by gravity, itno the receiver 15. From the receiver 15 the liquid refrigerant flows outwardly into the connecting line 16 to the expansion valve 17. This valve 17 is of the conventional type designed to receive a fluid at a higher pressure and to deliver the fluid therefrom at a lower pressure.

From the expansion valve 17 the refrigerant passes into the evaporator means, shown herein as a series of coils 18. These coils pass through a space 19 from which it is desired to remove a quantity of heat.

The lowering of the refrigerant pressure resulting from its passage through the valve 17 causes it to evaportae and to absorb heat from the space 19 in which the evaporator 18 is located. It then passes into the return line 20.

The return line 20 connects at 23 into a valve means 24 and the outlet side of the valve means 24 is connected at 25 into the inlet chamber 27 of the compressor. The path of refrigerant then leads through the valve 11 into the cylinder 10 and thence through the valve 12 into the outlet chamber 28 which communicates with the high pressure, or discharge line 13, as has been hereinabove described.

The connection 21 is shown inserted in the return line 20, outwardly of, or more properly on the inlet side of the valve means 24. A line 22 from this connection 21 leads to the sump 3.

The compressor 2 should be a type which has no direct or internal connection from the inlet port 25 or inlet chamber 27 or inlet valve 11 to the enclosed oil sump 3. This compressor 2 is shown as a conventional, single cylinder piston type with valves 11 and 12 located in the head plate 26. A multiple cylinder compressor may also be used or any other type of compressor which has a closed oil sump and has no connection between the oil sump and the inlet of the compressor. However, a conventional piston type of compressor with inlet valve located on, or in the piston, cannot be used. Any prime mover or source of power may be used to actuate the compressor.

Line 20 from the evaporator 18 is connected to the control valve means 24. This means may be a simple manually controlled valve of the globe, gate, or needle valve type which may be either completely or partially closed. The valve means 24 also may be a solenoid operated valve which may be closed or partially closed by any of the variable conditions available for controlling the valve means. These variables may be the temperature of the space the evaporator is cooling, the discharge pressure, the speed of the compressor, [the suction pressure,] the flow of gas through the suction or discharge line, or any other variables which need be limited or controlled. An automatic mechanical valve may be employed which is controlled by any of the available variables, or also a combination of one or more of the above mentioned types of valves may be used, either singularly or in multiples.

Line 22 is connected to line 20 preferably at 23 near the inlet to valve means 24 so that it will provide a gas pressure in the oil sump 3 which will not change rapidly when valve means 24 is operated. This line 22 is arranged so that any oil which may leak into the system will be returned, preferably by gravity, to the oil sump 3.

For convenience pressure in that portion of the system between the downstream side of the control valve 24 and the inlet valve 11 is referred to as control pressure.

When valve means 24 is shut off no gas will pass through the compressor so there will be no refrigerant circulating through the system which will cause it to become inoperative until it is desired to start the process again, at which time valve means 24 is opened and the gas is again allowed to flow. The oil then will be returned through line 22 (or 22'). The energy consumed by the compressor when the valve is closed will be only that required to overcome the losses of friction and the losses introduced by the leakage of the valves and pistons. If the valve means 24 is partially closed, the amount of energy consumed by the compressor and the amount of heat transferred by the system will be proportional to the amount the valve is opened.

In any refrigeration or air conditioning system in which a liquid refrigerant is evaporated to absorb the heat of vaporization of the refrigerant, the total amount of refrigeration produced is directly proportional to the total mass or weight of the liquid evaporated, such weight being equal to the weight or mass of the vaporized gas produced. As this gas must be re-condensed by the compressor, the total amount of refrigeration produced in the closed system will also be directly proportional to the weight or mass of the gas passing through the compressor. The mass of gas passing through the compressor will be determined by the mass of gas forced into each cylinder or compression chamber at the time of maximum displacement, such maximum displacement occurring at the bottom of the stroke in a cylinder and piston type compressor.

In the range of pressures, in which the inlet of the compressor operates, the density of the gas (neglecting the temperature change which is relatively small at this point) varies directly as the absolute pressure (Boyle's law). As the volume of gas in the cylinder or chamber, at each time of maximum displacement, is constant, then the density of the gas will be directly proportional to the mass. From this it follows that the mass or weight of gas flowing through the compressor is directly proportional to the absolute pressure of the gas at the input. Thus in a refrigeration system of this type, using a given compressor and refrigerant, the amount of refrigeration produced per stroke or revolution of the compressor will be directly proportional to the absolute pressure on the inlet chamber.

Therefore, a system as outlined hereinabove has been developed wherein the inlet pressure to the compressor may be varied without causing these variations in pressure to be transferred directly to *other parts of the system* [the oil sump] where [the lowering of the] *abrupt* pressure *changes* may cause [such] difficulties. [as foaming of the oil, leakage of air into the system, and inoperation of the oil pump, if used.]

Broadly, therefore, this invention considers varying the amount of heat transferred in a refrigeration system and the input of mechanical energy thereunto by controlling the pressure on the inlet of the compressor, without [lowering the crankcase or evaporator pressure.] *causing abrupt pressure changes in other parts of the system.*

What is claimed is:

[1. A closed refrigeration system including a compressor having an inlet, a discharge line, and a sump for compressor oil, a refrigerant to be supplied to the compressor through the inlet as a low pressure gas, compressed therein, and expelled through the discharge line as a high pressure gas, a condenser connected to the discharge line, means connected to the condenser providing a restricted passage to receive refrigerant from the condenser and to discharge it at a lowered pressure, an evaporator connected to the outlet from said passage to receive the refrigerant therefrom and permit it to evaporate and absorb heat from the space around the evaporator, a return line from the evaporator to the compressor inlet, a control valve means interposed in said return line, to provide a control pressure between said control valve and the compressor inlet isolated pneumatically and hydrostatically from the sump so that the control pressure is not communicated directly to the sump, and means providing a passage from the sump to a gas filled portion of the system downstream from said restricted passage and upstream from the control valve, whereby a pressure other than the control pressure is exerted on the sump and any oil which may leak into the system will be restored to the sump.]

[2. A closed refrigeration system including a compressor having an inlet, a discharge line, and a sump for compressor oil, a refrigerant to be supplied to the compressor through the inlet as a low pressure gas, compressed therein, and expelled through the discharge line as a high pressure gas, a condenser connected to the discharge line, means connected to the condenser providing a restricted passage to receive the refrigerant from the condenser and to discharge it at a lowered pressure, an evaporator connected to the outlet from said passage to receive the refrigerant therefrom and permit it to evaporate and absorb heat from the space around the evaporator, a return line from the evaporator to the compressor inlet, a control valve means interposed in said return line to provide a control pressure space between said control valve and the compressor inlet isolated pneumatically and hydrostatically from the sump so that the control pressure is not communicated directly to the sump, said sump being in communication with a gas filled portion of the system downstream from the compressor discharge and upstream from the control valve whereby a pressure other than the control pressure is exerted on the sump and any oil which may leak into the system will be restored to the sump.]

[3. In a refrigeration system wherein apparatus is provided including a piston-type compressor with one end of a piston therein in communication with a gas-tight crankcase for the compressor which is adapted to contain a lubricating oil and wherein the opposite end of said piston is in communication with suction and discharge conduits controlled by conventional compressor suction and discharge valves, respectively, and wherein said suction and discharge conduits are respectively connected to evaporating and condensing means of a closed refrigerating system, the improvement which comprises in combination therewith of a flow control means in said suction conduit and a conduit between said crankcase and the suction conduit upstream of said control means.]

[4. The apparatus of claim 3 wherein the point at which said last mentioned conduit connects to said suction conduit is at a vertical level above its inlet to said crankcase whereby a lubricant in a refrigerant passing through said compressor can flow to said crankcase.]

[5. A compressor system which comprises, in combination, a piston-type compressor having one end of a piston therein in communication with suction and discharge conduits controlled by conventional compressor suction and discharge valves, respectively, and having a sump in communication with the other end of said piston and adapted to contain a lubricating oil, a flow control means in said suction conduit and a conduit between said sump and said suction conduit upstream of said flow control means.]

6. A refrigeration system comprising in combination with a prime mover having duties requiring speeds of operation independent of the amount of refrigeration required, a compressor connected to said prime mover to be driven thereby at speeds dependent on the speed of said prime mover and having an inlet, a discharge, and an oil retaining space, a condenser having its inlet connected to said compressor discharge, means connected to the outlet of said condenser providing a restricted passage from the condenser and an evaporator connected to the outlet from said passage, a return line from the evaporator to the compressor inlet, a control valve means interposed in said return line, *means for manually setting said control valve means to limit the mass of gas flowing to said compressor* and means providing a passage from the oil retaining space to a portion of the system downstream from said restricted passage and upstream from the control valve *means*, whereby *maximum mass of refrigerant* intake to said compressor may be controlled independently of its speed without rapid variation in the pressure in said oil retaining space.

[7. A refrigeration system comprising in combination with a prime mover having required speeds of operation independent of the amount of refrigeration required, a compressor connected to said prime mover to be driven thereby at speeds dependent on the speed of said prime mover and having an inlet, a discharge, and an oil retaining space, a condenser having its inlet connected to the discharge from said compressor, means connected to the outlet of said condenser providing a restricted passage from the condenser, and an evaporator connected to the outlet from said passage, a return line from the evaporator to the compressor inlet, a control valve means interposed in said return line to provide a control pressure space between said control valve and the compressor inlet isolated pneumatically and hydrostatically from the oil retaining space so that the control pressure is not communicated directly to the oil retaining space, said oil retaining space being in communication with a gas filled portion of the system downstream from the compressor discharge and upstream from the control valve whereby a pressure other than the control pressure is exerted on the oil retaining space and any oil which may leak into the system will be restored to the oil retaining space.]

[8. Refrigeration apparatus adapted for use in a vehicle comprising a compressor having a driving connection adapted to be connected to a part on said vehicle which moves with respect to the remainder of the vehicle as the vehicle travels from place to place, whereby said compressor will be driven at speeds depending upon the speed of movement of said part of the vehicle to which it is connected, said compressor having also an inlet, a compression space, an outlet, and an oil retaining space, a control valve connected to the inlet for controlling the intake to said compressor, and connections to the entrance of said valve and from the outlet of said compressor, said connections, valve, compression space, inlet and outlet, providing a refrigerant passage, said oil retaining space being isolated from that portion of the refrigerant passage between said control valve and said compressor outlet and being in communication with said refrigerant passage beyond the limits of that portion of the refrigerant passage downstream from said control valve and upstream from said compressor outlet.]

[9. A compressor system which comprises in combination, a compressor having an inlet, a compression space, an outlet, and an oil retaining space, a control valve connected to the inlet for controlling the intake to said compressor, connections to the inlet of said valve and from the outlet from said compressor, said connections, valve, compressor space, and inlet and outlet providing a refrigerant passage, said oil retaining space being isolated from that portion of the refrigerant passage between said control valve and said compressor outlet and said oil retaining space being in communication with said refrigerant passage beyond the limits of that portion of the refrigerant passage downstream from said control valve and upstream from said compressor outlet.]

*10. A refrigeration system comprising in combination with a prime mover having required speeds of operation independent of the amount of refrigeration required, a compressor connected to said prime mover to be driven thereby at speeds dependent on the speed of said prime mover and having an inlet, a discharge, and an oil retaining space, a condenser having its inlet connected to the discharge from said compressor, means connected to the outlet of said condenser providing a restricted passage from the condenser, and an evaporator connected to the outlet from said passage, a return line from the evaporator to the compressor inlet, a control valve means interposed in said return line to provide a control pressure space between said control valve means and the compressor inlet isolated pneumatically and hydrostatically from the oil retaining space so that the control pressure is not communicated directly to the oil retaining space, said oil retaining space being in communication with a gas filled portion of the system downstream from the compressor discharge and upstream from the control valve means whereby a pressure other than the control pressure is exerted on the oil retaining space and any oil which may leak into the system will be restored to the oil retaining space, said*

*control valve means including means for controlling and limiting the mass of gas passing through said control valve means independently of the evaporator pressure.*

*11. A refrigeration compressor system which comprises, in combination, a compressor having an inlet, a compression space, an outlet, and an oil retaining space, an electrically actuated shut-off and metering valve settable to a desired predetermined maximum opening connected to the inlet for controlling the intake to said compressor, connections to the inlet of said valve and from the outlet from said compressor, said connections, valve, compression space, and inlet and outlet providing a refrigerant passage, said oil retaining space being isolated from that portion of the refrigerant passage between said valve and said compression space outlet, and said oil retaining space being in communication with said refrigerant passage beyond the limits of that portion of the refrigerant passage downstream from said valve and upstream from said compression space outlet, whereby the control pressure between the valve and the intake to said compressor may be regulated to any value desired.*

References Cited in the file of this patent or the original patent

UNITED STATES PATENTS

| Number | Name | Date |
|---|---|---|
| 1,247,209 | Bertsch | Nov. 20, 1917 |
| 1,436,815 | Marshall | Nov. 28, 1922 |
| 1,698,941 | Davenport | Jan. 15, 1929 |
| 1,768,602 | Hull | July 1, 1930 |
| 2,032,230 | Small et al. | Feb. 25, 1936 |
| 2,061,599 | Smith | Nov. 24, 1936 |
| 2,301,656 | Hirche | Nov. 10, 1942 |
| 2,418,853 | Shoemaker | Apr. 15, 1947 |